United States Patent
Latus

(10) Patent No.: US 6,642,168 B1
(45) Date of Patent: Nov. 4, 2003

(54) METHOD FOR METAL LOADING OF A MULTI-BED ADSORBENT SYSTEM

(75) Inventor: Donald G. Latus, Elgin, IL (US)

(73) Assignee: UOP LLC, Des Plaines, IL (US)

(*) Notice: Subject to any disclaimer, the term of this patent is extended or adjusted under 35 U.S.C. 154(b) by 230 days.

(21) Appl. No.: 09/844,528

(22) Filed: Apr. 27, 2001

(51) Int. Cl.$^7$ .................................................. B01J 29/06
(52) U.S. Cl. ............................ 502/64; 502/60; 502/79; 502/180; 502/400
(58) Field of Search ............................. 502/60, 64, 79, 502/180, 400

(56) References Cited

U.S. PATENT DOCUMENTS

| | | | |
|---|---|---|---|
| 4,529,828 A | 7/1985 | Antos et al. | 585/828 |
| 4,615,806 A | 10/1986 | Hilton | 210/690 |
| 4,859,217 A * | 8/1989 | Chao | 95/130 |
| 4,874,525 A | 10/1989 | Markovs | 210/673 |
| 5,013,334 A | 5/1991 | Maurer | 55/26 |
| 5,604,169 A * | 2/1997 | Leavitt | 502/60 |
| 5,833,844 A * | 11/1998 | Leavitt | 210/142 |
| 5,932,509 A * | 8/1999 | Balse et al. | 502/65 |
| 5,958,817 A * | 9/1999 | Leavitt | 502/64 |
| 5,962,735 A | 10/1999 | Kulprathipanja et al. | 562/608 |
| 2002/0031472 A1 * | 3/2002 | Masini et al. | 423/700 |

FOREIGN PATENT DOCUMENTS

| | | | |
|---|---|---|---|
| EP | 0 659 481 | * | 6/1995 |
| JP | 10-277386 | * | 10/1998 |

* cited by examiner

Primary Examiner—Tom Dunn
Assistant Examiner—Christina Ildebrando
(74) Attorney, Agent, or Firm—John G. Tolomei; Frank S. Molinaro; Arthur E. Gooding

(57) ABSTRACT

A novel and efficient process for the loading of metals onto adsorbent beds in an overall adsorption system comprising at least two beds can overcome many of the problems associated with traditional metal-loaded adsorbent preparation techniques. These problems include waste stream generation and disposal, drying requirements, and shrinkage/swelling effects. In addition to an adsorption bed, the system includes either an upstream bed (e.g. a pretreatment bed) or a downstream bed (e.g. a post treatment bed). These supplemental beds are often not loaded initially with metal, but can serve to guard against poisons and foulants that detrimentally affect the overall adsorption. The method is useful for in-situ ion exchange loading of metals for which the adsorbent has a strong affinity. The method is particularly advantageous for loading iodine-reactive metals (e.g. silver) onto zeolitic or resin-based adsorbents used for treating iodine-containing feeds, such as commercial acetic acid product streams.

25 Claims, No Drawings

METHOD FOR METAL LOADING OF A MULTI-BED ADSORBENT SYSTEM

FIELD OF THE INVENTION

The present invention relates to a novel process for loading metals onto adsorbent beds in an overall adsorption process unit comprising at least two beds, an adsorption bed and either an upstream bed (e.g. a pretreatment bed) or a downstream bed (e.g. a post treatment bed). The method is particularly useful for in-situ ion exchange loading of metals for which the adsorbent has a strong affinity.

BACKGROUND OF THE INVENTION

Metal loaded adsorbents are applied in a wide variety of separation and contaminant removal processes. For example, U.S. Pat. No. 4,874,525 B1 teaches the use of a zeolite containing either ionic or elemental silver to remove mercury contaminants from a number of process streams including natural gas. U.S. Pat. No. 5,013,334 B1 employs a zinc metal-exchanged faujasite type of zeolitic aluminosilicate to effect the separation of ethane from methane by selective adsorption. U.S. Pat. No. 4,529,828 B1 provides a silver cation exchanged zeolite X for the isolation of orthoxylene from a stream of mixed xylene isomers. For purifying commercial acetic acid streams produced by methanol carbonylation in the presence of an iodide promoter, both zeolites and resins that have been exchanged with an iodide reactive metal (e.g. silver) can be employed, as disclosed in U.S. Pat. No. 5,962,735 B1 and U.S. Pat. No. 4,615,806 B1, respectively.

The commercial preparation of metal loaded adsorbents may involve agitating or stirring a slurry of adsorbent particles in a metal containing solution, such as an aqueous solution of a salt of the metal. Otherwise, the adsorbent may be placed in a fixed bed and contacted continuously with a metal-containing solution. In this mode of operation, recycling of the solution over the adsorbent to increase the solution residence time is often desirable. In any case, the main contacting conditions of time, temperature, solution concentration, and agitation rate are based on a number of factors, including the equilibrium ratio of solid-phase to dissolved metal, the rate of metal uptake, the desired concentration of loaded metal, and the structural integrity of the adsorbent. Metal loading may be enhanced, especially in cases where the metal used is limited in solubility in the solution, by periodically or continuously withdrawing a portion of solution that has been depleted of its metal content during the process of metal loading the adsorbent. The withdrawn solution is then replaced with fresh solution having a higher metal content than that removed.

In general, commercial methods for loading metals by ion exchange, impregnation, pore filling, and others suffer in that waste streams are generated that normally require further treatment. In some cases, residual metal solutions, for example those containing mercury or lead, can pose environmental hazards without special handling and disposal techniques. The use of certain metallic solutions may be precluded altogether at certain adsorbent preparation facilities lacking necessary permits and/or recovery equipment. Furthermore, even when the metal loading of adsorbents is authorized, expensive metals such as silver, platinum, and palladium must be recovered from waste streams, at some cost, and re-used.

While the metal loading of adsorbents according to methods described above results in a wet material, the efficient transport of such a metal loaded adsorbent mandates that it be shipped in a dry state. This also economically impacts the synthesis of metal loaded adsorbents in terms of higher costs for energy and disposal associated with driving metal containing solution from the adsorbent. Finally, with resins in particular, material shrinkage may significantly reduce the volume of dry material, complicating commercial bed designs where the adsorbent is used in its swollen state.

To overcome these drawbacks associated with prior art methods of preparing metal loaded adsorbents in separate manufacturing facilities, followed by transport to the location of their use, applicant now provides an effective method for in-situ loading of metal onto an adsorbent. The method is applicable for the significant number of commercial adsorption processes that rely on adsorbent beds for either pre- or post-treatment in addition to the primary adsorption function. These supplemental beds are often not loaded initially with metal, but can serve to guard against poisons and foulants that detrimentally affect the overall adsorption process. Alternatively, adsorbent beds downstream of the initially metal loaded bed serve to trap or contain valuable metal that can leach from the metal loaded adsorbent bed over the course of normal operation. A characteristic of supplemental adsorbent beds to which the present invention applies is that they are not significantly affected, in terms of their intended purpose, when partially loaded with some the same type of metal that is loaded onto the adsorption bed.

SUMMARY OF THE INVENTION

The present invention is a method of loading metal onto at least one adsorption bed of adsorbent and at least a second bed of adsorbent used for either pre- or post-treatment of the process stream to be treated by adsorption. The invention overcomes many of the drawbacks associated with preparing metal loaded adsorbents at a location remote from the process where such adsorbents are ultimately used. A specific advantage of the invention is the convenient, in-situ treatment of residual streams that would require separate disposal in commercial adsorbent manufacturing facilities.

In one embodiment, the present invention is a method for in-situ loading of a metal on an adsorbent system comprising an adsorption bed and a post-treatment bed downstream of the adsorption bed in normal operation. The adsorption bed and post-treatment bed have both affinity and capacity for the metal. The method comprises flowing a solution of the metal through the adsorption bed to contact it with the solution and yield a metal loaded adsorption bed, a first metal-depleted solution within the adsorption bed, and excess solution. The method further comprises contacting at least part of the post-treatment bed with the excess solution to load at least a portion of the metal contained therein onto the post-treatment bed and yield second metal-depleted solution within the post-treatment bed. The method further comprises transferring the first metal-depleted solution from the metal loaded adsorption bed to either the post-treatment bed or a pretreatment bed to load at least a portion of the metal contained in the first metal-depleted solution thereon.

In a more specific embodiment, the present invention is a method as described above where the solution is an aqueous solution of a compound of the metal and an anion selected from the group consisting of nitrate, nitrite, sulfate, sulfite, phosphate, carbonate, acetate, hydroxide, and mixtures thereof; the adsorption bed comprises a zeolite molecular sieve selected from the group consisting of LZ-210, Y-85, mordenite, zeolite A, zeolite X, zeolite Y, and mixtures thereof; and the metal is selected from the group consisting of silver, mercury, copper, lead, thallium, palladium, barium, and mixtures thereof; where the metal is loaded onto the adsorption bed by ion exchange.

In another embodiment, the present invention is a method for in-situ loading of a metal on an adsorbent system comprising a pretreatment bed and an adsorption bed downstream of the pretreatment bed in normal operation. The pretreatment bed and adsorption bed have both affinity and capacity for the metal. The method comprises flowing a solution of the metal through the adsorption bed to contact it with the solution and yield a metal loaded adsorption bed, a first metal-depleted solution within the adsorption bed, and excess solution. The method further comprises contacting at least part of the pretreatment bed with the excess solution to load at least a portion of the metal contained therein onto the pretreatment bed and yield second metal-depleted solution within the pretreatment bed. The method further comprises transferring the first metal-depleted solution from the metal loaded adsorption bed to either the pretreatment bed or a post-treatment bed to load at least a portion of the metal contained in the first metal-depleted solution thereon.

In yet another embodiment, the present invention is a method according to the last-mentioned embodiment and further comprising removing the second metal-depleted solution from the pretreatment bed to the post-treatment bed to load at least a portion of the metal contained in the second metal-depleted solution thereon.

These and other embodiments and objects will become clearer after the detailed description of the invention.

DETAILED DESCRIPTION OF THE INVENTION

As mentioned, the present invention is a method for loading metals onto a system of adsorbent beds comprising an adsorption bed and at least one upstream pretreatment bed or one downstream post-treatment bed. Typically, the pretreatment bed is used in the overall adsorptive process unit to guard against metals, trace contaminants, and other species from entering the adsorption bed and adversely affecting its operation. The post-treatment bed may be used to remove types of impurities different from those removed by the adsorption bed. Another common use of a post-treatment bed is to protect against valuable components, such as metals loaded onto the adsorption bed, from leeching into the process liquid and escaping the system. The invention is further characterized in that it is used for the preparation of adsorbents within the process where they are ultimately employed. This in-situ metal loading is especially advantageous where off-site manufacture is either complicated by waste stream treatment and disposal requirements or even prohibited for environmental reasons.

The adsorption bed is contained within a vessel having the proper fluid conduit connections appropriate for normal adsorption operation, as well as flushing and regeneration. The adsorption bed and vessel must also have the ability to withstand the temperature, pressure, fluid flow rate, corrosivity, and other conditions associated with its normal use. These conditions include the environment associated with any regeneration procedure used to restore activity after an extended time. The adsorption bed itself comprises an adsorbent onto which a metal is loaded prior to use in normal operation. The adsorbent to which the process of the present invention applies comprises broadly any solid material onto which metal may be loaded through contact with a metal-containing solution. Zeolites and resins are useful as adsorbent because of their ability to incorporate reactive metals into their molecular frameworks by ion exchange. This method of metal dispersion promotes a uniform distribution (since ion exchange sites are concentrated evenly throughout the solid carrier) and provides a very stable metal-exchanged adsorbent. A further advantage of using zeolites in some applications is their selectivity for reacting specifically shaped and sized molecules, as dictated by the configuration of the microporous channels through which they must diffuse. Certainly, adsorbent materials known in the art including crystalline compounds such as alumina or amorphous supports such as activated carbon are also applicable to the present invention. A variety of methods for dispersing reactive metals from liquid solutions onto such materials are known in the art.

More broadly, any type of molecular sieve and not only a zeolite may serve as a carrier material for the adsorbent of the present invention. While a zeolite is a crystalline aluminosilicate, a molecular sieve can contain framework elements other than aluminum and silicon situated within tetrahedral sites of an extensive three-dimensional network of neighboring oxygen atoms. Types of materials classified as molecular sieves are explained in detail in *Molecular Sieves, Principles of Synthesis and Identification* by R. Szostak (Van Nostrand Reinhold, 1989) at pages 2–4. These include silicas, metalloaluminates, aluminophosphates, and others.

Overall, therefore, carrier materials can include, for example, zeolites such as LZ-210, Y-85, mordenite, zeolite A, zeoite X, or zeolite Y; molecular sieves such as crystalline manganese phosphates, titanosilicates (Szostak, p. 250–252), or silicoaluminophosphates (Szostak, p. 269–272); or resins such as Amberlyst® 15 (Rohm and Haas, Philadelphia, Pa.), Reillex® 425 (Reilly Industries, Indianapolis, Ind.), or Deloxan® THP (Degussa AG, Frankfurt, Germany). Resins may be either the macroreticulated type (e.g. Amberlyst® 15) or they may be gel resins (e.g. Dowex® 26, available from Dow Chemical Co., Midland, Mich.). The zeolites LZ-210 and Y-85 are defined in U.S. Pat. No. 4,503,023 B1 and U.S. Pat. No. 5,013,699 B1, respectively, and details pertaining to the synthesis and characterization of these materials are contained in these references. The zeolite mordenite is described according to its structure and properties in *Zeolite Molecular Sieves* by Donald W. Breck (John Wiley and Sons, 1974) at pages 122–124 and 162–163. Crystalline manganese phosphates may be naturally occurring or synthesized according to procedures outlined in U.S. Pat. No. 5,780,003 B1. Zeolites A, X, and Y are described according to their structures and with respect to their preparation methods according to U.S. Pat. No. 2,882,243 B1; U.S. Pat. No. 2,882,244 B1; and U.S. Pat No. 3,130,007 B1; respectively.

As stated, the adsorbent comprises a solid material, preferably a resin or a molecular sieve, onto which a reactive metal may be dispersed, preferably via ion exchange, from solution. The adsorbent is typically in the form of a pellet, pill, or extrudate, shaped according to techniques well known in the art. Also, in normal adsorptive service, the adsorbent is generally used in a fixed-bed configuration through which a feed stream is passed. Of course, adsorbents normally used in a moving- or fluidized-bed systems, as well as in batch operations, may also be metal loaded according to the present invention. The main requirement is that the overall adsorbent system comprises at least two beds, an adsorption bed and either a pre- or post-treatment bed. Often, the pre- and post-treatment beds will comprise the same adsorbent material that is used in the adsorption bed, except that in the adsorption bed the material is primarily in its metal-loaded form to treat process streams. This is especially true where a pre-treatment bed is used to scavenge, from the process stream, species that might interfere with the metal function of, or otherwise be detrimental to, the adsorption bed operation. Generally, it is desirable to remove such species if the adsorbent has significant selectivity for them.

The process of the present invention comprises metal loading the adsorbent bed system, comprising at least two beds, by flowing a solution containing the metal to be loaded through the adsorption bed. Contacting the adsorption bed with the solution then provides a metal loaded adsorption bed. Since metal adsorption equilibrium favors at least a portion of the dissolved metal becoming fixed onto the solid adsorbent material, the solution remaining within the interstitial voids between solid particles is necessarily of a lower concentration in metal than its original metal concentration. The remaining solution is therefore metal-depleted. Furthermore, in addition to this first metal-depleted solution remaining within the bed, there is also an amount of excess solution that has passed through the entire length of the adsorption bed and exited it. For any given metal concentration in the starting solution, increasing the amount of excess solution improves the approach to the equilibrium metal loading onto the adsorption bed.

Rather than disposing of the excess solution, it can instead be passed, in view of the fact that at least one other bed is present, to either a pretreatment bed or post-treatment bed having capacity and affinity for the metal. If the same adsorbent is used for either the pre- or post-treatment bed as that used for the adsorption bed, then the requisite affinity of these beds for the metal will necessarily exist. The capacity for the metal will also be satisfied unless the pre- or post-treatment bed is also loaded to capacity with the same metal as that used as in the adsorption bed or loaded with a different metal for which the adsorbent has a stronger affinity. Often in multi-bed adsorption processes, it is desirable to use a metal-loaded adsorption bed in conjunction with non-metal loaded adsorbents of the same type to serve as pre- and/or post-treatment beds. In such cases, the metal-loading procedure of the present invention applies, although it is not limited to these situations. For example, a system having an upstream pretreatment bed comprising a resin followed by an adsorption bed comprising a metal-exchanged zeolite may also be effectively prepared by the present invention if the resin also has metal-exchange capacity.

After the excess metal-containing solution, exiting from the metal-loaded adsorption bed, is passed to one of either the pre- or post-treatment beds, the affinity and capacity of this bed for the metal means that at least a portion of the metal in the excess solution will be loaded thereon. The excess solution preferably contacts only a portion of either the pre- or post-treatment, leaving an un-contacted portion essentially free of the metal and thus with its full capacity for metal loading. After a portion of metal from the excess solution is loaded onto either the pre- or post-treatment bed, a second metal-depleted solution is now contained within at least a portion of this bed.

The concentration of metal in the second metal-depleted solution is less than that in the excess solution. Furthermore, the second metal-depleted solution, after having undergone two-stages of solid-liquid equilibrium transfer stages, also has a metal concentration considerably less than that of the original metal solution. This second metal-depleted solution is therefore often very dilute in metal and of a relatively small volume. Therefore, it is usually acceptable that this solution be rinsed from the pre- or post-treatment bed during normal adsorbent bed preparation steps, such as flushing with de-ionized water. Otherwise, it is also certainly possible to further transfer this second metal-depleted solution to either the pretreatment of post-treatment bed for additional metal utilization. For example, in the case where the second metal-depleted solution is within the pretreatment bed, it may be drained therefrom and contacted with part of the post-treatment bed having capacity for the metal, so that further metal loading is achieved.

The first metal-depleted solution residing in the adsorption bed represents the bulk of the remaining solution. This solution is conveniently pumped or drained from the adsorption bed, now comprising a metal-loaded adsorbent, into the either the pre- or post-treatment beds for an additional equilibrium exchange of metal from the metal-depleted solution thereon. Thus, the existence of supplemental beds, having capacity for metal loading in an overall adsorption process unit relying on a metal-loaded adsorption bed, provide a means of in-situ adsorbent preparation without requiring the disposal of substantial amounts of metal or metal-containing solution.

Preferably, contacting of metal-containing solution with the adsorption bed is performed in an upflow manner to provide optimal distribution by preventing channeling or trickling that is often associated with low liquid flow rates over relatively large cross-sectional areas. In one embodiment, an adsorption bed and a post-treatment bed may be contained in a single, vertical vessel with appropriate connections to allow upflow during in-situ metal loading according to the present invention as well as during normal operation. In this case, the point of introduction of metal solution for contacting adsorbent defines the bottoms of the adsorption bed. The top of this bed may be defined by a point above which excess solution, now residing in the post-treatment bed as the second metal-depleted solution, may be removed and discarded or reused. In this arrangement, the first metal depleted solution is conveniently drained or pumped from the bottom of the adsorption bed and contacted with the post-treatment bed, preferably at its upper or middle portion.

In another configuration, the adsorption bed and post-treatment bed may be contained in separate vessels to allow for easy unloading and replacement. Preferably, this arrangement includes necessary piping between the vessels containing the beds to allow upflow of fluid through each bed. In this case, metal loading according to the present invention is accomplished by contacting the adsorption bed with upwardly flowing metal solution and transferring the excess solution to the lower region of the post treatment bed, along the normal flow path of process fluid during adsorption service. Contacting excess solution instead with the upper region of the post treatment bed would require additional flow communication between the upper regions of the adsorption bed and the post-treatment bed.

Likewise, in the case where the adsorption system comprises a pretreatment bed positioned vertically to allow upflow, the normal flow arrangement does not allow excess solution exiting the top of the adsorption bed to be routed to the pretreatment bed. Here, extra connections would be required to provide fluid communication from the top of the adsorption bed to either the upper or lower portions of the pretreatment bed. In a preferred embodiment, the adsorption system comprises a pretreatment bed, an adsorption bed, and a post-treatment bed in separate, vertically-aligned vessels with fluid connections to allow upward flow through each bed. In this particular case, the metal solution is contacted with the adsorption bed in an upflow manner to yield the first metal-depleted solution residing in the adsorption bed and the excess solution that is subsequently passed, using additional fluid connections, to the lower region of the pretreatment bed. The resulting, second metal-depleted solution residing in the pretreatment bed is then passed, along with the first metal-depleted solution, to the lower region of the post-treatment bed and contacted with adsorbent therein. This additional transfer of the second metal-depleted solution to the post-treatment bed allows an extra increment of metal to be loaded onto the post-treatment bed and thereby retained in the overall multi-bed adsorbent system.

The metal-containing solution must generally allow sufficient metal compound solubility therein to effect the desired degree of metal loading. The solution must also have acceptable properties in terms of inertness with respect to the adsorbent and its pendant functional groups in terms of corrosivity and reactivity. Preferred are aqueous solutions of a compound of the metal and an anion selected from the group consisting of nitrate, nitrite, sulfate, sulfite, phosphate, halide, carbonate, acetate, hydroxide, and mixtures thereof. It is also preferred that the dissolved metal compound used is present in the metal-containing solution in an amount from about 0.5% to about 20% by weight, since insufficient metal loading onto the adsorbent and solubility problems are often encountered below and above this range, respectively.

In cases where the metal is particularly strongly adsorbed onto the adsorbent, it may be difficult to achieve a uniform metal distribution throughout the bed using the once-through metal contacting step of the present invention. In upflow contacting of metal solution with the adsorption bed, only the bottom portion of adsorbent may be loaded to a level corresponding to equilibrium with the starting metal solution, while adsorbent located at higher positions may be only slightly loaded. In the absence of using a recycle flow of metal containing solution to more evenly load the adsorption bed, a dispersing agent is appropriate. The dispersing agent is a species, such as an additional metal cation, for which the adsorbent has some affinity, and competes with the metal for metal loading sites within the adsorbent. Selectivity of the adsorbent for the dispersing agent means that metal will be deposited uniformly over a broader adsorbent volume than otherwise possible. When a dispersing agent is used, it is preferable that it is present in the metal containing solution and comprises a metal selected from the group consisting of alkali metals, alkaline earth metals, rare earth metals, and mixtures thereof. A number of factors, including the relative affinity of the adsorbent for the metal and dispersing agent and the desired degree of metal loading onto the adsorption bed, will dictate the relative amounts of metal and dispersing agent used in the metal containing solution. Preferably, the dispersing agent to metal molar ratio is from about 1 to about 10.

A particular adsorption system to which the in-situ, once through, metal loading procedure of the present invention applies is the removal of trace iodine containing compounds from commercial acetic acid streams. Such process are known in the art and described, for example, in the previously mentioned references U.S. Pat. No. 4,615,806 B1 and U.S. Pat. No. 5,962,735 B1 for resin- and zeolite-based iodine compound adsorption systems, respectively. Currently, iodine-containing promoters, such as methyl iodide or lithium iodide, are necessary in acetic acid production to maintain competitive reaction rates. Even using the most careful fractionation, acetic acid produced via methanol carbonylation using these promoters will still contain a small amount, typically below 100 parts per billion of total iodine, both organic and inorganic, by weight. More complete removal, however, is desired due to the detrimental effects of iodine-containing compounds on downstream catalytic processes, such as the conversion of acetic acid to vinyl acetate monomer.

In the adsorption process units used to treat commercial acetic acid contaminated with iodine-containing compounds, a zeolite is effective when it has been cation exchanged with a metal that is reactive with iodine and iodine-containing compounds. Particularly, ion exchange with silver, mercury, copper, lead, thallium, palladium, barium or mixtures thereof gives good results for use in liquid-phase iodine compound adsorption service. The most preferred metal for ion exchange, in this application, is silver. For converting the sodium, ammonia, or hydrogen form of the molecular sieve or resin adsorbent into the metal-exchanged form suitable for use in an iodine-containing compound removal process, contact with a water soluble salt of the metals recited above is appropriate. Also, a non-aqueous organic medium may be used provided sufficient solubility of the salt is possible. Acetate, nitrate, or halide salts are often used for the ion exchange procedure and the appropriate conditions are typically room temperature and atmospheric pressure. Preferably, the metal that is loaded represents from about 1% to about 15% of the final metal-exchanged adsorbent weight.

As described in the aforementioned U.S. Pat. No. 5,962,735 B1, the distinguishing and novel characteristics of the zeolite are its silica to alumina framework ratio and pore size, both of which are particularly important to the overall effectiveness of the material for use in treating corrosive liquid streams. The silica to alumina molar ratio of the zeolite must allow for sufficient stability in corrosive environments as well as acceptable ion exchange capacity. Therefore, a zeolite having a silica to alumina molar framework ratio from about 5 to about 15 is preferred. However, other adsorption processes to which the metal loading procedure of the present invention applies use zeolitic adsorbents with lower silica to alumina ($SiO_2/Al_2O_3$) molar ratios, since corrosivity of the normal process stream is not a significant concern. For example, U.S. Pat. No. 4,874,525 B1 describes a technique for the removal of mercury from a variety of process streams, including hydrocarbons, using a two-bed system. The first bed is a desiccant to dry the stream prior to treatment with a silver-exchanged zeolite, which may include zeolite A, zeolite X, or zeolite Y. These zeolites may have silica to alumina molar framework ratios as low as about 1.5. Overall, therefore, the preferable range of adsorbent silica to alumina molar ratios for adsorbents to which the metal loading procedure applies is from about 1.5 to about 15.

Also preferred are those zeolite of large-pore consideration, whose molecular sieve channels are formed by 12-member rings. Useful zeolites of this classification include mordenite, zeolite Y, zeolite L, omega, ZSM-12 and beta. These materials are more particularly described in the previously mentioned U.S. Pat. No. 5,962,735 B1 with reference to their crystalline structure, composition, properties, and methods of synthesis. Zeolites having the Y structure, modified by steam or chemical treatment to achieve a specific range of silica to alumina framework ratios, are also of primary interest. A particular type of modified zeolite Y is the LZ-210 version that requires chemical treatment to increase its silica to alumina framework ratio through "secondary synthesis" technology. A definition of zeolite LZ-210 and details of its synthesis from conventional zeolite Y by chemical treatment is given in U.S. Pat. No. 4,503,023 B1. Another type of modified zeolite Y that is particularly useful is Y-85, a steam-stabilized and chemically modified zeolite Y. Preparation details for Y-85 are fully disclosed in U.S. Pat. No. 5,013,699 B1.

Where a molecular sieve-based adsorbent is used comprising a zeolite that is available only in a powder form, a pure zeolite is generally not used. Instead, the zeolite is bound into larger particles such as pellets, extrudates, or spheres. As described in the '735 patent, a binder material may be combined with zeolites to make larger size particles with sufficient strength suitable for use in the adsorption step of the present invention. It is of course, necessary that the binder material is not soluble to any significant degree in the corrosive liquid feed stream to be treated. Preferred binder materials are the inorganic refractory metal oxides selected from the group consisting of silica, titania, zirconia, chromia, bona, vanadia, magnesia, and mixtures thereof. Silica, in addition to its stability in corrosive media, is most preferred in practice because of its ready availability and low cost. Binder materials such as alumina which are susceptible to attack in acidic solutions are not suitable when the adsorbent is to be used for removing iodine-containing compounds from acetic acid.

However, alumina is a preferred binder when used in non-corrosive media such as hydrocarbon streams as described in the previously mentioned adsorption process of U.S. Pat. No. 4,874,525 B1, for the removal of mercury from fluid streams. Other binder materials, such as clays, are also preferred in this service. Suitable clays can include, for example commercially available products such as kaolin, kaolinite, montmorillonite, saponite, and bentonite. These clays can be used as mined in their natural state, or they may also be employed in highly active forms, typically activated by an acid treatment procedure. Commercial suppliers of these clays include Thiele Kaolin Company (Sandersville, Ga.), American Colloidal Co. (Arlington Heights, Ill.), GSA Resources, Inc. (Tucson, Ariz.), Albion Kaolin Co. (Hephzibah, Ga.), and others. Overall, preferred binders applicable to the present invention are therefore silica, titania, zirconia, chromia, boria, vanadia, magnesia, alumina, clays, and mixtures thereof.

The types of metal-exchanged adsorbents described above that are selective for adsorbing both iodine- and mercury-containing impurities, generally rely on the use an expensive metal (e.g. silver). For this reason, an adsorption bed comprising a metal-exchanged adsorbent is normally employed in conjunction with a pretreatment or guard bed to provide a more economical operation. In the case of the iodine-containing compound adsorption process of U.S. Pat. No. 5,962,735 B1, the function of the pretreatment bed is to remove specific iodine compounds or metals from the iodine-compound containing process stream. Pretreatment of the process liquid is therefore desired to remove specific iodine-containing impurities (e.g. hydrogen iodide), representing the bulk of the iodine-containing contaminants. This pretreatment prior to contacting the process stream with the metal-loaded adsorbent provides for more judicious use of the iodine-reactive metal. In other cases, a pretreatment bed for removing metal contaminants in the process stream will prevent the loss of valuable iodine-reactive metal used in the metal-loaded adsorbent, due to ion exchange of contaminant metals (e.g. potassium or calcium) for the expensive iodine-reactive metal (e.g. silver).

Pretreatment beds that are effective for removing at least a portion of either contaminant iodine compounds or contaminant metals, include, for example carbonaceous materials, as described in U.S. Pat. No. 4,615,806 B1. Carbon is used specifically to remove hydrogen iodide and molecular iodine prior to removing more minute iodine-contaminants (e.g. hexyl iodide) with the metal-loaded adsorbent. Particularly effective in this service are activated carbons, wood charcoal, bone char, lignite, and others. Of these, activated carbon and, as noted in U.S. Pat. No. 5,457,230 B1, activated carbon fiber are both preferred forms.

Another pretreatment bed is described in U.S. Pat. No. 5,344,976 B1, whereby a cation exchange resin without iodine-reactive metal is placed upstream of the metal-loaded adsorption bed used for iodine-containing compound removal. In this case, the pretreatment bed scavenges any of a number of potential metal cations, thus preventing their exposure to the metal-loaded adsorbent. Using a pretreatment bed, undesired metal cations present in the process stream that could potentially displace the iodine-reactive metal of the metal-loaded adsorbent are removed. For this purpose, a number of strong acid cation exchange resins of both the macroreticular and gel type have been found suitable when used in their hydrogen form. These resins include both the macroreticular or highly crosslinked types such as Amberlyst® 15 (available from Rohm and Haas Company, Philadelphia, Pa., USA), as well as gel types such as Dowex® D-26 (available from Dow Chemicals, Inc., Midland Mich.). Other particular cation exchange resins suitable for this pretreatment service are described in U.S. Pat. No. 5,344,976 B1.

Additionally, a non-metal exchanged form of a cation exchange zeolite may be incorporated upstream of the metal-loaded adsorbent as a pretreatment bed and scavenger of metals and other impurities. In one embodiment, the adsorbent system may include a metal-loaded zeolitic adsorbent as described in U.S. Pat. No. 5,962,735 B1 with a pretreatment bed comprising the same material (i.e. a bound zeolite) but without any added metal. Overall, then, appropriate pretreatment beds that are effective in iodine-containing compound adsorption systems, when used prior to the metal-loaded adsorbent, include cation exchange zeolites, cation exchange resins, and activated carbon. It may be also be desirable to combine two or more of these pretreatment beds into a single vessel upstream of the adsorption bed. Multiple vessels containing pretreatment beds can, of course, also be employed.

Similarly, the use of beds downstream of the metal-loaded adsorbent bed in iodine-compound adsorbent systems can also improve economics. These post-treatment beds can recover small amounts of metal leeched from the adsorption bed that would otherwise be lost in the process liquid. Again, suitable products selective for the adsorption of cations include those already described as effective pretreatment media, namely cation exchange zeolites and resins that are stable in the process stream, as well as activated carbon. Especially preferred materials for post-treatment include the cation exchange resins noted previously, for example, Amberlyst® 15 and Dowex® D-26 in their respective hydrogen forms. For use in the metal loading procedure of the present invention, the pretreatment and post-treatment bed materials described above are applicable, since they are used in a manner such that they have both capacity and affinity for the metal used for the metal-loaded adsorbent.

What is claimed is:

1. A method for in-situ loading of metal in an adsorbent system comprising an adsorption bed and a post-treatment bed, where both the adsorption bed and post-treatment bed have capacity and affinity for the metal, the method comprising:

a) flowing a solution of the metal through the adsorption bed to contact it with the solution and yield a metal loaded adsorption bed, a first metal-depleted solution within the adsorption bed, and excess solution;

b) contacting at least part of the post-treatment bed with the excess solution to load at least a portion of the metal contained therein onto the post-treatment bed and yield second metal-depleted solution within the post-treatment bed; and, c) transferring the first metal-depleted solution from the metal loaded adsorption bed to either the post-treatment bed or a pretreatment bed to load at least a portion of the metal contained in the first metal-depleted solution thereon.

2. The method of claim 1 where in step (b) the adsorbent bed is contacted with upwardly flowing solution.

3. The method of claim 1 where the adsorption bed and post-treatment bed are contained in a single vessel oriented vertically and the post-treatment bed is above the adsorption bed.

4. The method of claim 1 where the adsorption bed and the post-treatment bed comprise the same material.

5. The method of claim 1 where the post-treatment bed comprises a post-treatment material selected from the group consisting of cation exchange resins, cation exchange zeolites, activated carbon, and mixtures thereof.

6. The method of claim 1 where the pretreatment bed comprises a pretreatment material selected from the group consisting of cation exchange resins, cation exchange zeolites, activated carbon, and mixtures thereof.

7. The method of claim 1 where the metal is present in the metal loaded adsorption bed in an amount from about 1% to about 15% by weight.

8. The method of claim 1 where the adsorption bed and post-treatment bed are contained in separate vessels oriented vertically and in fluid communication to allow upward fluid flow through each bed and also allow fluid exiting the upper region of the adsorption bed to enter the lower region of the post-treatment bed.

9. The method of claim 8 where the pretreatment bed is contained in a separate vessel oriented vertically and in fluid communication with the adsorption bed to allow upward fluid flow through the pretreatment bed and also allow fluid exiting the upper region of the adsorption bed to enter the lower region of the pretreatment bed.

10. The method of claim 1 where the solution comprises a dispersing agent selected from the group consisting of alkali metals, alkaline earth metals, rare earth metals, and mixtures thereof.

11. The method of claim 10 where the dispersing agent to metal molar ratio in the solution is from about 1 to about 10.

12. The method of claim 1 where the solution is an aqueous solution of a compound of the metal and an anion selected from the group consisting of nitrate, nitrite, sulfate, sulfite, phosphate, halide, carbonate, acetate, hydroxide, and mixtures thereof.

13. The method of claim 12 where the compound is present in the solution in an amount from about 0.5% to about 20% by weight.

14. The method of claim 1 where the adsorption bed comprises a resin or a molecular sieve.

15. The method of claim 14 where the adsorption bed comprises a zeolite molecular sieve selected from the group consisting of LZ-210, mordenite, Y-85, zeolite A, zeolite X, zeolite Y, and mixtures thereof.

16. The method of claim 14 where the adsorption bed comprises a zeolite molecular sieve having a silica to alumina molar framework ratio from about 1.5 to about 15.

17. The method of claim 14 where the adsorption bed comprises a bound zeolite molecular sieve comprising a zeolite and an inorganic refractory metal oxide binder selected from the group consisting of silica, titania, zirconia, chromia, boria, vanadia, magnesia, alumina, clays, and mixtures thereof.

18. The method of claim 17 where the zeolite is present in an amount of at least 70% by weight relative to the bound zeolite.

19. The method of claim 14 where the metal is selected from the group consisting of silver, mercury, copper, lead, thallium, palladium, barium, and mixtures thereof, and where the metal is loaded onto the adsorption bed by ion exchange.

20. The method of claim 19 where the metal is present in the metal loaded adsorption bed in an amount from about 30% to about 70% of its ion exchange capacity.

21. A method for metal loading an adsorbent system comprising a pretreatment bed and an adsorption bed, where both the pretreatment bed and adsorption bed have capacity and affinity for the metal, the method comprising:

a) flowing a solution of the metal through the adsorption bed to contact it with the solution and yield a metal loaded adsorption bed, a first metal-depleted solution within the adsorption bed, and excess solution;

b) contacting at least part of the pretreatment bed with the excess solution to load at least a portion of the metal contained therein onto the pretreatment bed and yield second metal-depleted solution within the pretreatment bed; and, c) transferring the first metal-depleted solution from the metal loaded adsorption bed to either the pretreatment bed or a post-treatment bed to load at least a portion of the metal contained in the first metal-depleted solution thereon.

22. The method of claim 21 further comprising removing the second metal-depleted solution from the pretreatment bed to the post-treatment bed to load at least a portion of the metal contained in the second metal-depleted solution thereon.

23. The method of claim 21 where the adsorption bed and pretreatment bed are contained in separate vessels oriented vertically and in fluid communication to allow upward fluid flow through each bed and also allow fluid exiting the upper region of the adsorption bed to enter the lower region of the pretreatment bed.

24. The method of claim 23 where the post-treatment bed is contained in a separate vessel oriented vertically and in fluid communication with the adsorption bed to allow upward fluid flow through the post-treatment bed and also allow fluid exiting the upper region of the adsorption bed to enter the lower region of the post-treatment bed.

25. The method of claim 21 where step (c) comprises transferring the first metal-depleted solution from the metal loaded adsorption bed to the post-treatment bed, the process further comprising, after step (c), transferring the second metal-depleted solution from the pretreatment bed to the post-treatment bed to load at least a portion of the metal contained in the second metal-depleted solution thereon.

* * * * *